(12) United States Patent
Kawakami

(10) Patent No.: US 12,040,734 B2
(45) Date of Patent: Jul. 16, 2024

(54) ESTIMATION DEVICE, ESTIMATION METHOD, AND PROGRAM

(71) Applicant: Nidec Corporation, Kyoto (JP)

(72) Inventor: Hiroyuki Kawakami, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 116 days.

(21) Appl. No.: 17/912,299

(22) PCT Filed: Mar. 9, 2021

(86) PCT No.: PCT/JP2021/009384
§ 371 (c)(1),
(2) Date: Sep. 16, 2022

(87) PCT Pub. No.: WO2021/187254
PCT Pub. Date: Sep. 23, 2021

(65) Prior Publication Data
US 2023/0141056 A1 May 11, 2023

(30) Foreign Application Priority Data
Mar. 18, 2020 (JP) .................. 2020-047778

(51) Int. Cl.
*H02K 29/08* (2006.01)
*G01D 5/14* (2006.01)
*H02P 6/16* (2016.01)

(52) U.S. Cl.
CPC ............... *H02P 6/16* (2013.01); *G01D 5/145* (2013.01); *H02K 29/08* (2013.01)

(58) Field of Classification Search
CPC ........... H02P 6/16; G01D 5/145; H02K 29/08

USPC ..................................................... 318/400.38
See application file for complete search history.

(56) References Cited

U.S. PATENT DOCUMENTS

| | | | |
|---|---|---|---|
| 2009/0206827 A1 | 8/2009 | Aimuta et al. | |
| 2015/0069941 A1* | 3/2015 | Lwaji | ..................... H02P 6/183 318/400.11 |
| 2017/0343382 A1 | 11/2017 | Fukumura et al. | |
| 2018/0123488 A1* | 5/2018 | Lee | ........................ H02P 23/12 |

(Continued)

FOREIGN PATENT DOCUMENTS

| | | |
|---|---|---|
| JP | 2007-206018 A | 8/2007 |
| JP | 2011-185747 A | 9/2011 |
| WO | 2016/027838 A1 | 2/2016 |

OTHER PUBLICATIONS

Official Communication issued in International Patent Application No. PCT/JP2021/009384, dated Apr. 13, 2021.

*Primary Examiner* — Erick D Glass
(74) *Attorney, Agent, or Firm* — Keating & Bennett, LLP

(57) ABSTRACT

An estimation device that estimates a state of a device that detects a position of a rotating body includes a position sensor to output a detection signal that is a signal representing a detection result of a position of a magnet rotatable in conjunction with the rotating body according to a magnetic flux of the magnet, an extractor to extract a feature amount of the detection signal from the detection signal for each of the positions, and an estimator to derive an evaluation value representing a comparison result between a feature amount of the detection signal for each of the positions and a reference value for each of the positions, and to estimate a degree of change in sensitivity to detect the position based on the evaluation value.

8 Claims, 13 Drawing Sheets

(56) References Cited

U.S. PATENT DOCUMENTS

| | | | | |
|---|---|---|---|---|
| 2023/0141056 A1* | 5/2023 | Kawakami | ................ | H02P 6/16 318/400.38 |
| 2023/0336098 A1* | 10/2023 | Isobe | ........................ | H02P 6/16 |

* cited by examiner

Fig. 2

| POLE PAIR NUMBER | 0 | | | | 1 | | | | 2 | | | | 3 | | |
|---|---|---|---|---|---|---|---|---|---|---|---|---|---|---|---|
| SECTION | 0 | ... | 11 | 0 | ... | 11 | 0 | ... | 11 | 0 | ... | 11 | 0 | ... | 11 |
| SEGMENT | 0 | ... | 11 | 12 | ... | 23 | 24 | ... | 35 | 36 | ... | 47 |

ESTIMATION DEVICE, ESTIMATION METHOD, AND PROGRAM

CROSS-REFERENCE TO RELATED APPLICATIONS

This is a U.S. national stage of application No. PCT/JP2021/009384, filed on Mar. 9, 2021, and with priority under 35 U.S.C. § 119(a) and 35 U.S.C. § 365(b) being claimed from Japanese Patent Application No. 2020-047778, filed on Mar. 18, 2020, the entire disclosures of which are hereby incorporated herein by reference.

1. Field of the Invention

The present disclosure relates to an estimation device, an estimation method, and a program.

2. Background

There is a technique of estimating a position of a rotor of a motor using a general-purpose magnetic sensor mounted on the motor as standard. Since such a magnetic sensor is inexpensive and small, an estimation device using the magnetic sensor and a motor itself on which the estimation device is mounted can be inexpensive and small. Further, a position of a rotor can be estimated without using an expensive and large-sized dedicated position sensor such as an optical encoder or a magnetic encoder.

However, the above technique is a technique for estimating a position of a rotating body (such as a rotor of a motor), and does not include a function of estimating a degree of change in sensitivity of position detection. If a state of a sensor and a rotating body and a degree of sensitivity can be estimated, reduction in maintenance cost and reduction in stop time can be expected. For this reason, there is demand for estimating degree of change in sensitivity of position detection without providing an additional dedicated sensor for estimating the degree of change.

SUMMARY

One example embodiment of the present disclosure is an estimation device that estimates a state of a device that detects a position of a rotating body. The estimation device includes a position sensor to output a detection signal that is a signal representing a detection result of a position of a magnet rotatable in conjunction with the rotating body according to a magnetic flux of the magnet, an extractor to extract a feature amount of the detection signal from the detection signal for each of the positions, and an estimator to derive an evaluation value representing a comparison result between a feature amount of the detection signal for each of the positions and a reference value for each of the positions, and to estimate a degree of change in sensitivity to detect the position based on the evaluation value.

The above and other elements, features, steps, characteristics and advantages of the present disclosure will become more apparent from the following detailed description of the example embodiments with reference to the attached drawings.

BRIEF DESCRIPTION OF THE DRAWINGS

FIG. 2 is a diagram illustrating an example of a correspondence relationship between a pole pair number, a section, and a segment in the first example embodiment.

DETAILED DESCRIPTION

Example embodiments of the present disclosure will be described in detail with reference to the drawings.

Figure 1:
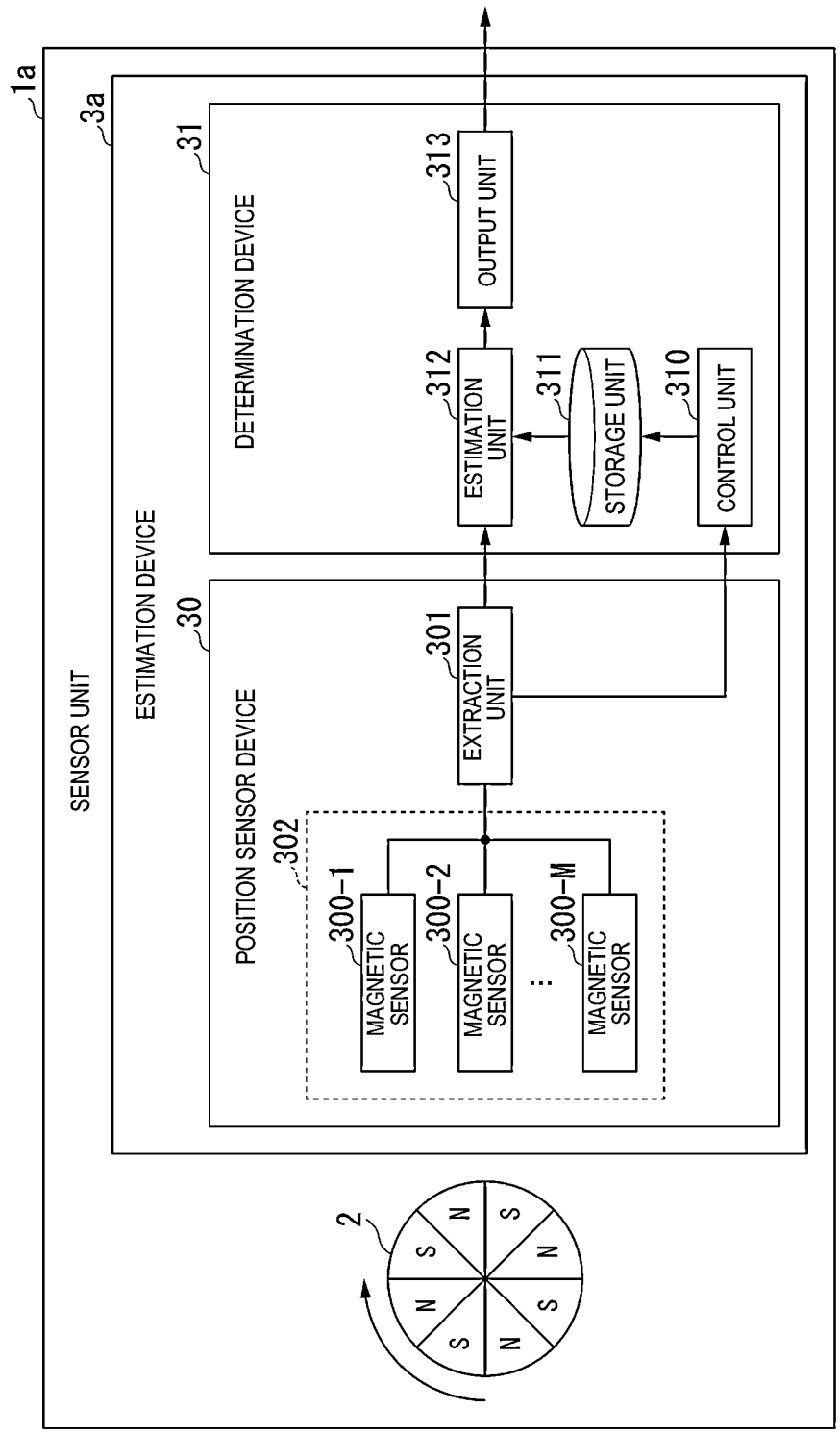
FIG. 1 is a diagram illustrating a configuration example of a sensor assembly according to a first example embodiment of the present disclosure.

FIG. 1 is a diagram illustrating a configuration example of a sensor assembly 1a in a first example embodiment. The sensor assembly 1a includes a magnet 2 and an estimation device 3a. The magnet 2 is a magnet for a position sensor that detects a position of a rotating object such as a rotor. Hereinafter, the number of pole pairs of the magnet 2 is four as an example. The estimation device 3a includes a position sensor device 30 and a determination device 31. The position sensor device 30 includes M (M is an integer of three or more) magnetic sensors 300 and an extractor 301. In the first example embodiment, "M" is three as an example. The position sensor device 30 includes M of the magnetic sensors 300 as a position sensor 302. The determination device 31 includes a control unit 310, a storage unit 311, an estimator 312, and an output unit 313. The sensor assembly 1a includes the magnet 2 and the position sensor device 30 as a device for detecting a position of a rotating body.

FIG. 2 is a diagram illustrating an example of a correspondence relationship between a pole pair number, a section, and a segment. A section number group is associated with a pole pair number. The number of section numbers is equal to the number of twelve ways of logic including a magnitude relationship of detection signals output from M of the magnetic sensors 300 and positive and negative (zero cross) of an intermediate signal.

In FIG. 2, a pole pair number "0" is associated with section numbers from "0" to "11". A segment number is a unique number representing an absolute value of a mechanical angle of the magnet 2. For example, segment numbers "0" to "11" are associated with section numbers "0" to "11" of a pole pair number "0". For example, segment numbers "12" to "23" are associated with section numbers "0" to "11" of a pole pair number "1". A data table representing the correspondence relationship illustrated in FIG. 2 is stored in advance in the storage unit 311, for example.

Figure 3:
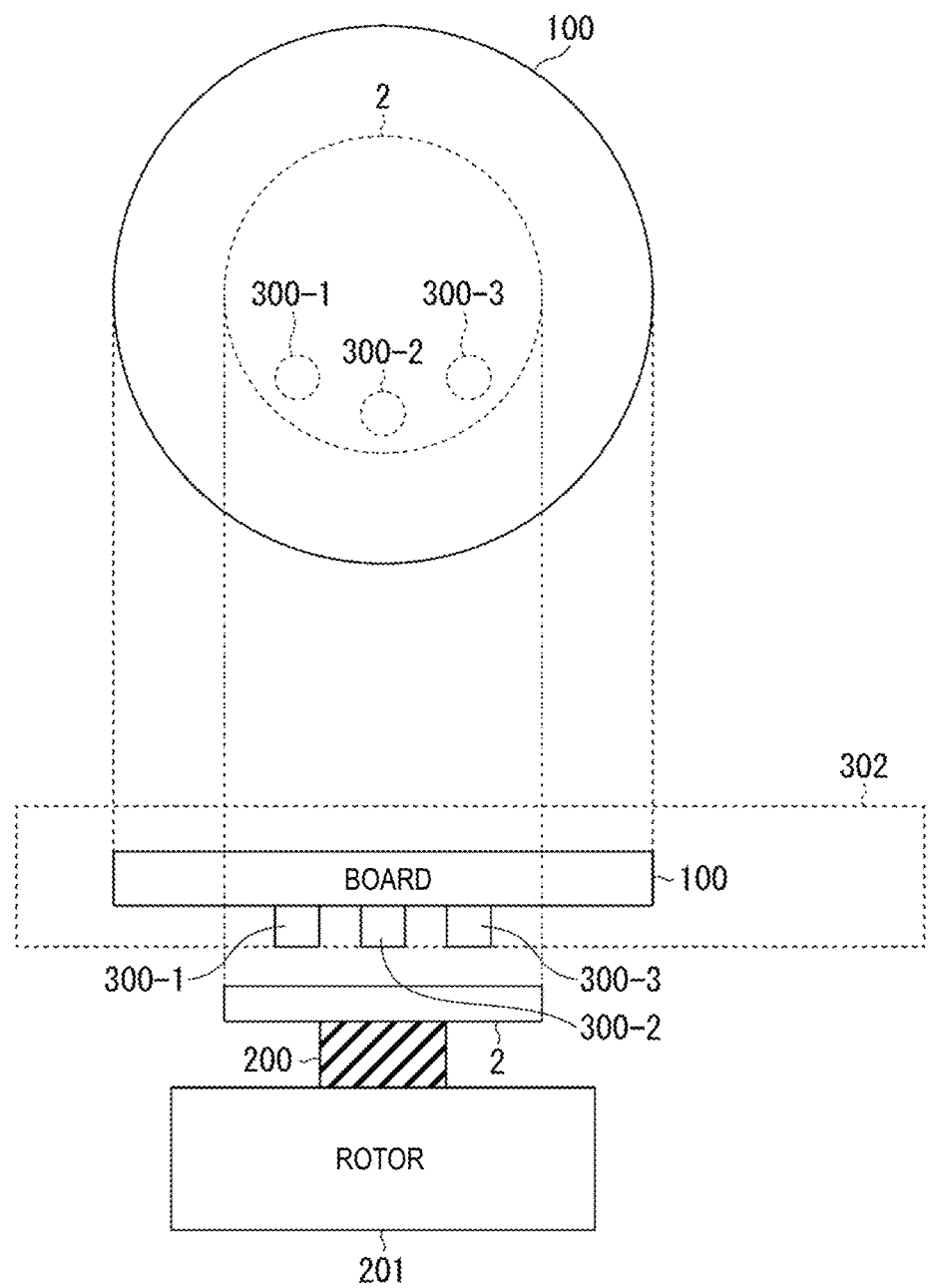
FIG. 3 is a diagram illustrating a configuration example of a position sensor in the first example embodiment.

FIG. 3 is a diagram illustrating a configuration example of the position sensor 302 in the first example embodiment. An upper part of FIG. 3 represents an upper surface of the position sensor 302. A lower part of FIG. 3 illustrates a side surface of the position sensor 302. M of the magnetic sensors 300 are provided on a board 100 whose position is fixed.

A rotor 201 is a rotating object. The rotating object is, for example, a rotation mechanism, and is not limited to a motor. The rotor 201 includes a main shaft 200. The magnet 2 is connected to the main shaft 200. When the rotor 201 rotates, the main shaft 200 rotates. The magnet 2 is rotatable in conjunction with the rotor 201 and the main shaft 200.

Next, details of the sensor assembly 1a will be described. Each of the magnetic sensors 300 outputs a detection signal, which is a signal representing a detection result of a position of the magnet 2 (magnetic flux component of a pole pair), to the extractor 301. Hereinafter, as an example, a magnetic sensor 300-1 outputs a U-phase detection signal indicating a position of the magnet 2 to the extractor 301. A magnetic sensor 300-2 outputs a V-phase detection signal indicating a position of the magnet 2 to the extractor 301. A magnetic sensor 300-3 outputs a W-phase detection signal indicating a position of the magnet 2 to the extractor 301.

The extractor 301 reduces in-phase noise in each detection signal. The extractor 301 extracts a feature amount of a detection signal from each detection signal for each position of the magnet 2. The extractor 301 outputs a feature amount (array data) of a detection signal for each position to the estimator 312 and the control unit 310.

Figure 4:
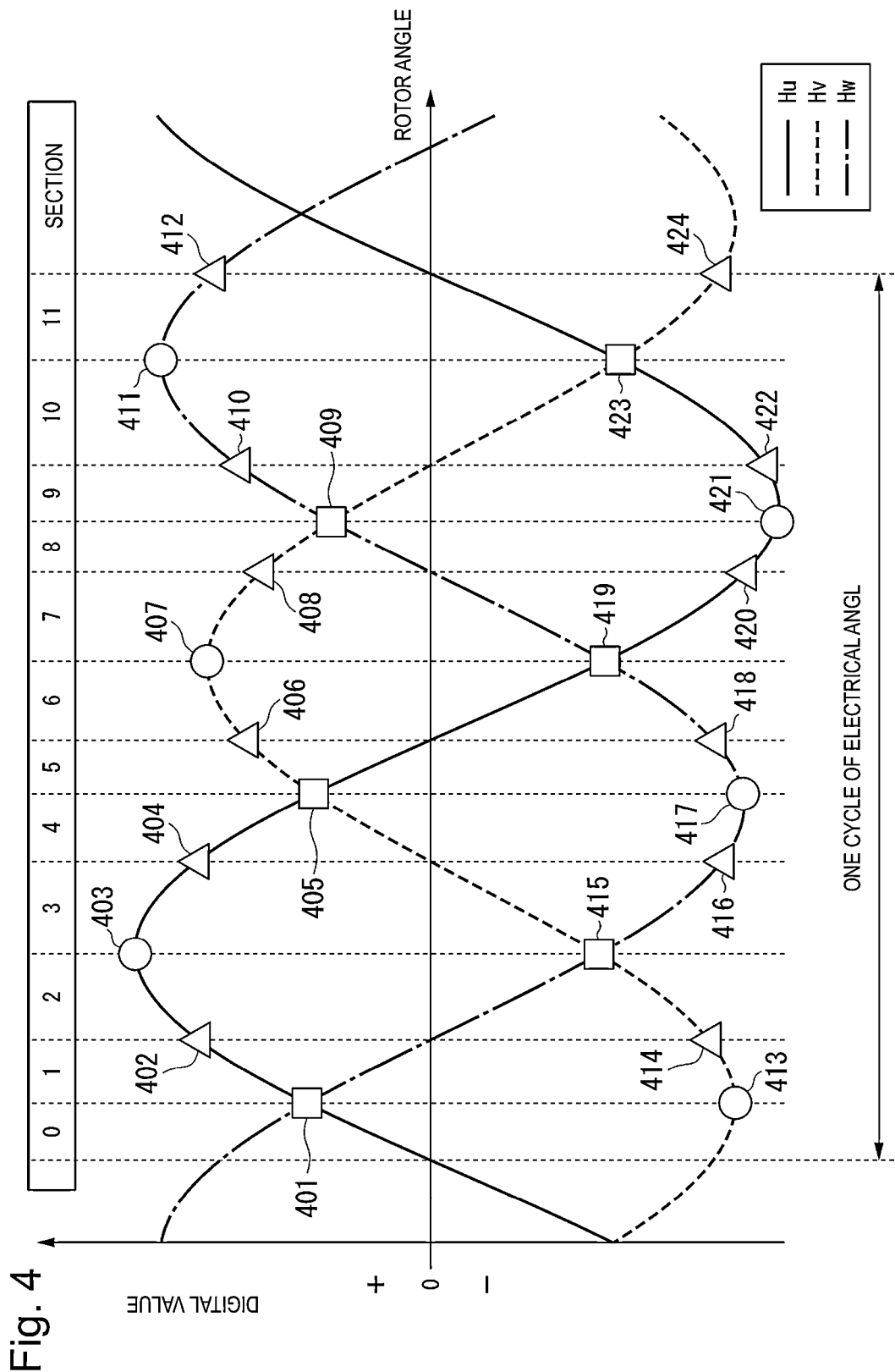
FIG. 4 is a diagram illustrating an example of a sample point of a detection signal in the first example embodiment.

FIG. 4 is a diagram illustrating an example of a sample point of a detection signal in the first example embodiment. The horizontal axis represents a rotor angle (position of the magnet 2). The vertical axis represents a digital value of a detection signal. "HU" represents a U-phase detection signal. "HV" represents a V-phase detection signal. "HW" represents a W-phase detection signal. In FIG. 4, sample points 401 to 424 are illustrated as an example of sample points representing n (n is an integer of one or more) feature amounts extracted from a detection signal.

Each of the sample point 401, the sample point 405, the sample point 409, the sample point 415, the sample point 419, and the sample point 423 is an intersection of waveforms of detection signals.

The sample point 402, the sample point 404, the sample point 406, the sample point 408, the sample point 410, and the sample point 412 are points representing feature amounts of other detection signals in a case where a digital value of a detection signal is zero (zero cross). For example, the sample point 402 indicates a digital value of the detection signal "HU" in a case where a digital value of the detection signal "HW" is zero. The sample point 414, the sample point 416, the sample point 418, the sample point 420, the sample point 422, and the sample point 424 are points representing feature amounts of other detection signals in a case where a digital value of a detection signal is zero (zero cross).

Each of the sample point 403, the sample point 407, and the sample point 411 is a maximum value of a digital value of a detection signal. Each of the sample point 413, the sample point 417, and the sample point 421 is a minimum value of a digital value of a detection signal.

Returning to FIG. 1, the description of the configuration example of the sensor assembly 1a will be continued. The control unit 310 controls operation of the storage unit 311. For example, the control unit 310 records a feature amount of a detection signal in the storage unit 311 for each sample point.

The storage unit 311 stores a feature amount (digital value) of a detection signal for each sample point as a feature amount of a detection signal for each position. Since there are not many sample points, storage capacity of the storage unit 311 may be small. The storage unit 311 stores a reference value for each position in advance. The reference value is, for example, a feature amount of a detection signal measured at a past time point. The past time point is, for example, a time point when the magnet 2 and the position sensor device 30 are attached or at the time of shipment. The reference value may be periodically updated.

A feature amount of a detection signal is input to the estimator 312 for each position (sample point). The estimator 312 derives an evaluation value representing a comparison result between a feature amount of a detection signal for each position and a reference value for each position. The evaluation value is expressed using a mean square error as in Equation (1), for example.

[Equation 1]

$$\frac{1}{n}\sum_{i=1}^{n}(r_i - d_i)^2 \quad (1)$$

Here, "ri" represents a reference value (reference feature amount). A value "di" represents a feature amount (measurement value) of a detection signal. A value "n" represents the number of samples included in a predetermined evaluation unit. The evaluation unit is, for example, one cycle of a mechanical angle or one cycle of an electrical angle. When evaluation is performed in each unit (phase unit) of the detection signal "Hu", the detection signal "Hv", and the detection signal "Hw", a reference value and a current value for a maximum value and a minimum value of each phase are compared in units of phases, so that a change in units of phases can be detected based on an evaluation value in units of phases.

The estimator 312 estimates degree of change in sensitivity for detecting a position on the basis of an evaluation value. For example, the estimator 312 compares a predetermined threshold with an evaluation value. In a case where an evaluation value is equal to or more than a threshold value, the estimator 312 may determine that sensitivity for detecting a position changes.

Figure 5:
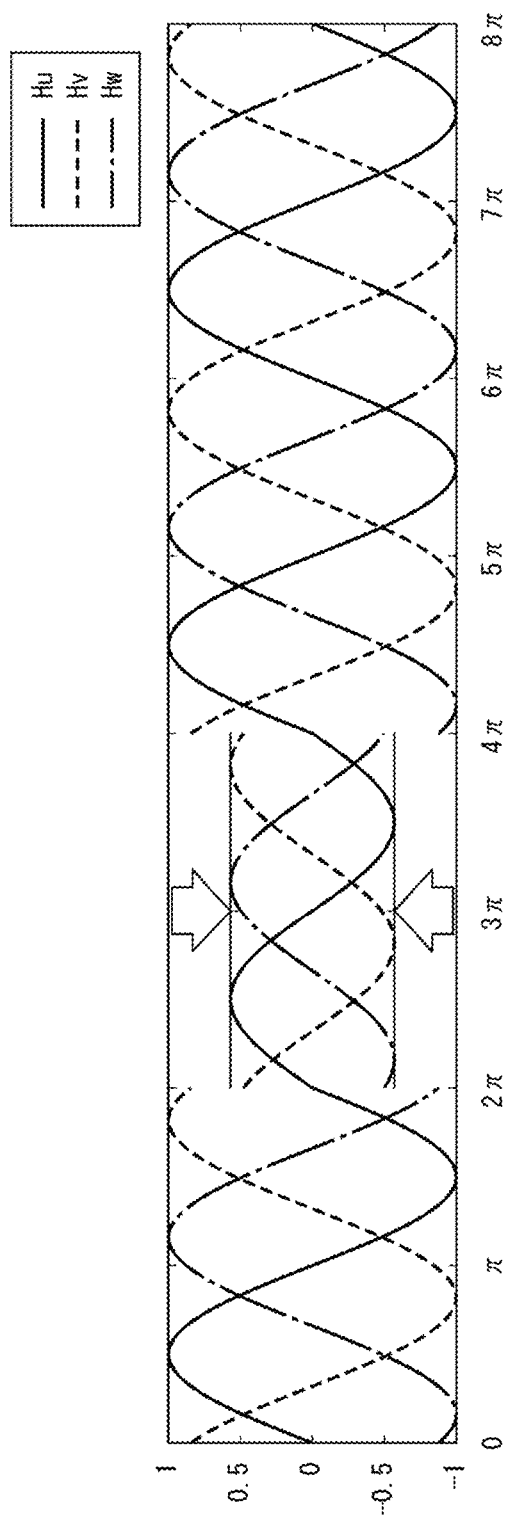
FIG. 5 is a diagram illustrating an example of a case where feature amounts of detection signals of all phases change in one cycle of an electrical angle in the first example embodiment.

FIG. 5 is a diagram illustrating an example of a case where feature amounts of detection signals of all phases change in one cycle of an electrical angle in the first example embodiment. The horizontal axis represents four cycles of an electrical angle (position of the magnet 2). Four cycles of an electrical angle correspond to one cycle of a mechanical angle of the magnet 2. The vertical axis represents a digital value of a detection signal.

In a case where a magnetic flux changes only in one pole pair of the magnet 2, a feature amount of the detection signals (HU, HV, and HW) of all phases change in one cycle of an electrical angle associated with the pole pair. In view of the above, in a case where an evaluation value indicates that a feature amount of a detection signal changes with respect to a reference value for each position in one cycle of an electrical angle in one cycle of a mechanical angle, the estimator 312 determines that a magnetic flux of a pole pair of a magnet associated with one cycle of an electrical angle changes. For example, in a case where an evaluation value as in Equation (1) is equal to or more than a threshold value, the estimator 312 may determine that a magnetic flux of a pole pair associated with one cycle of an electrical angle changes. In FIG. 5, the estimator 312 determines that a magnetic flux of a pole pair associated with electrical angles from "2n" to "4n" changes.

Figure 6:
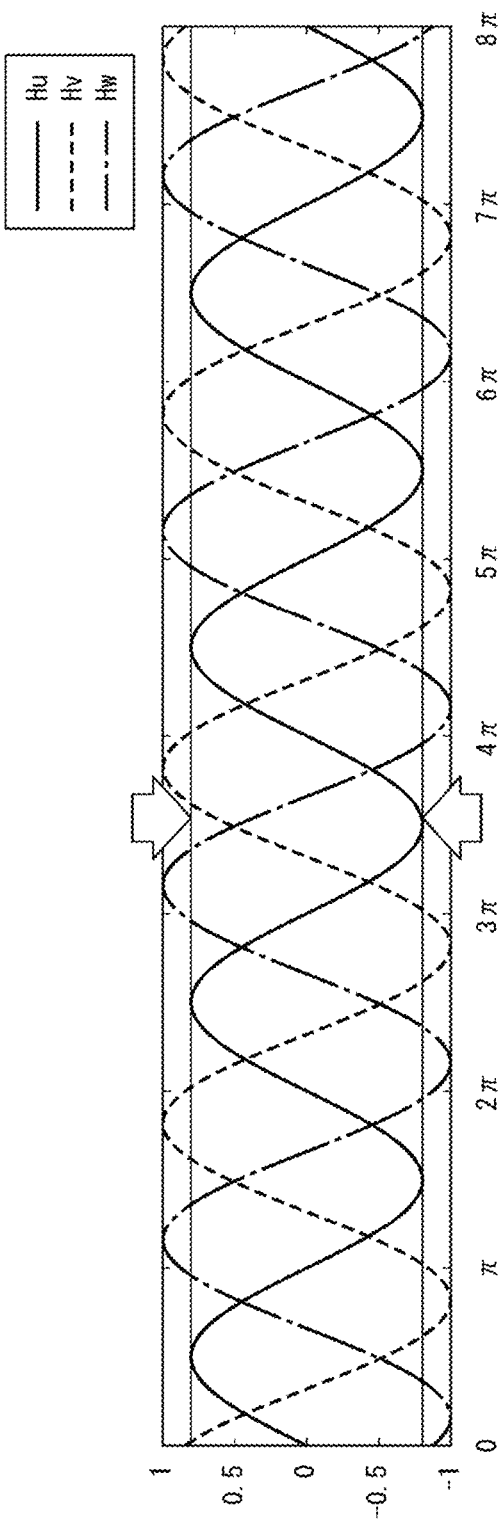
FIG. 6 is a diagram illustrating an example of a case where a feature amount of a detection signal of a specific phase changes in one cycle of a mechanical angle in the first example embodiment.

FIG. 6 is a diagram illustrating an example of a case where a feature amount of a detection signal of a specific phase changes in one cycle of a mechanical angle in the first example embodiment. The horizontal axis represents four cycles of an electrical angle (position of the magnet 2). The vertical axis represents a digital value of a detection signal.

In FIG. 6, in one cycle of a mechanical angle, as an example, a feature amount of a detection signal of the magnetic sensor 300 of the detection signal "HU" changes with respect to a reference value for each position. As a factor of this, there are a possibility that a distance between the magnetic sensor 300 that outputs the detection signal "HU" and the magnet 2 changes, and a possibility that sensitivity of the magnetic sensor 300 that outputs the detection signal "HU" changes.

In view of the above, in a case where an evaluation value represents that a feature amount of the detection signal "HU" of the magnetic sensor 300 changes with respect to a reference value for each position in one cycle of a mechanical angle, the estimator 312 determines that a distance between the magnetic sensor 300 that outputs the detection signal "HU" and the magnet 2 changes. The estimator 312 may determine that sensitivity of the magnetic sensor 300 that outputs the detection signal "HU" changes.

Figure 7:
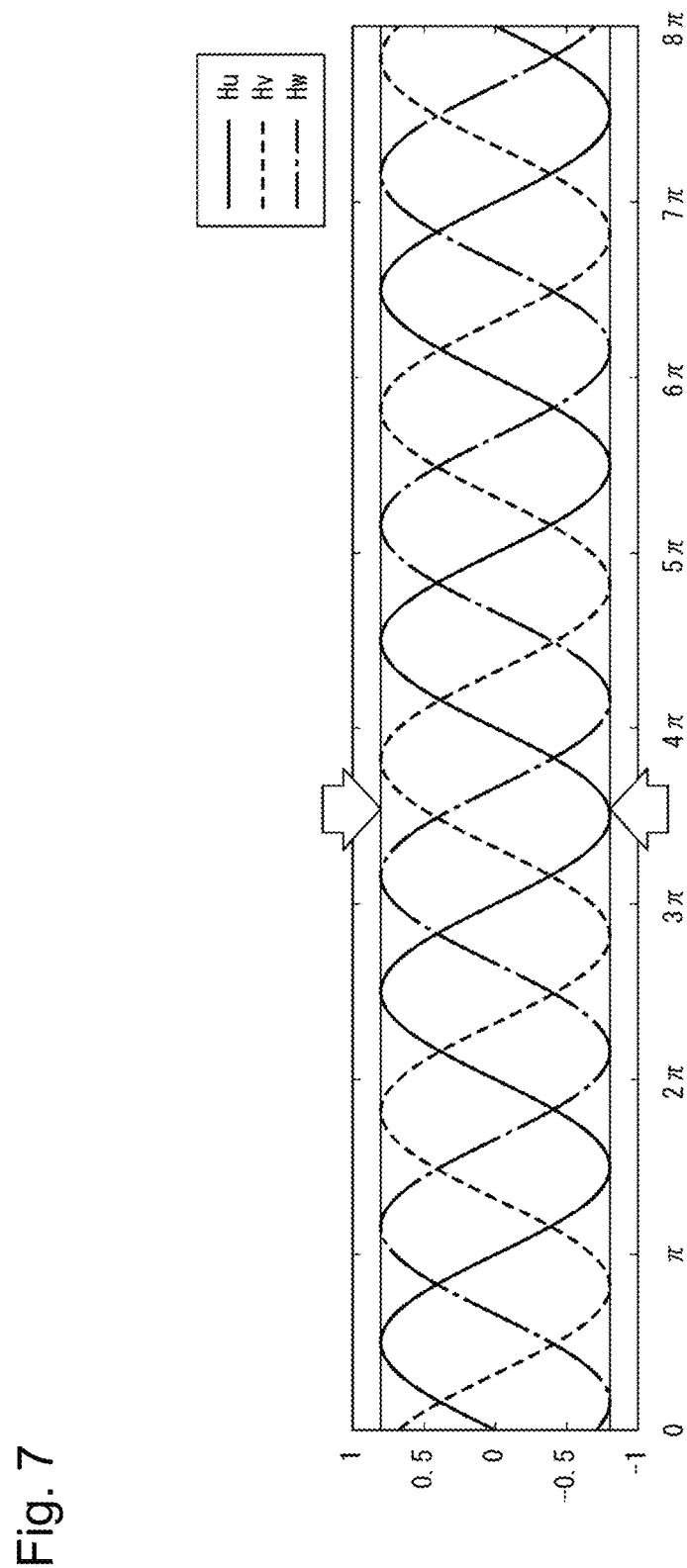
FIG. 7 is a diagram illustrating an example of a case where feature amounts of detection signals of all phases change in one cycle of a mechanical angle in the first example embodiment.

FIG. 7 is a diagram illustrating an example of a case where feature amounts of detection signals of all phases change in one cycle of a mechanical angle in the first example embodiment. The horizontal axis represents four cycles of an electrical angle (position of the magnet 2). The vertical axis represents a digital value of a detection signal.

In FIG. 7, in one cycle of a mechanical angle, feature amounts of detection signals of all the magnetic sensors 300 change with respect to a reference value for each position. As a factor of this, there are a possibility that magnetic fluxes of all pole pairs of the magnet 2 are changed and a possibility that all the magnetic sensors 300 are separated from the magnet 2 by a predetermined distance or more. The predetermined distance is, for example, a designed distance between the magnet 2 and the magnetic sensor 300.

In view of the above, in a case where an evaluation value indicates that feature amounts of the detection signals "HU", "HV", and "HW" of all the magnetic sensors 300 change with respect to a reference value for each position in one cycle of a mechanical angle, the estimator 312 determines that magnetic fluxes of all pole pairs of the magnet 2 change. The estimator 312 may determine that a distance between the magnet 2 and all the magnetic sensors 300 changes. The estimator 312 may determine that sensitivity of all the magnetic sensors changes.

The output unit 313 outputs degree of change in sensitivity for detecting a position to an external device (not illustrated). The output unit 313 may output a comparison result between degree of change in sensitivity for detecting a position and a threshold value to a predetermined external device. For example, in a case where degree of change is equal to or more than a threshold value, the output unit 313 may output a warning message to an external device (not illustrated) regarding a change in sensitivity for detecting a position.

Figure 8:
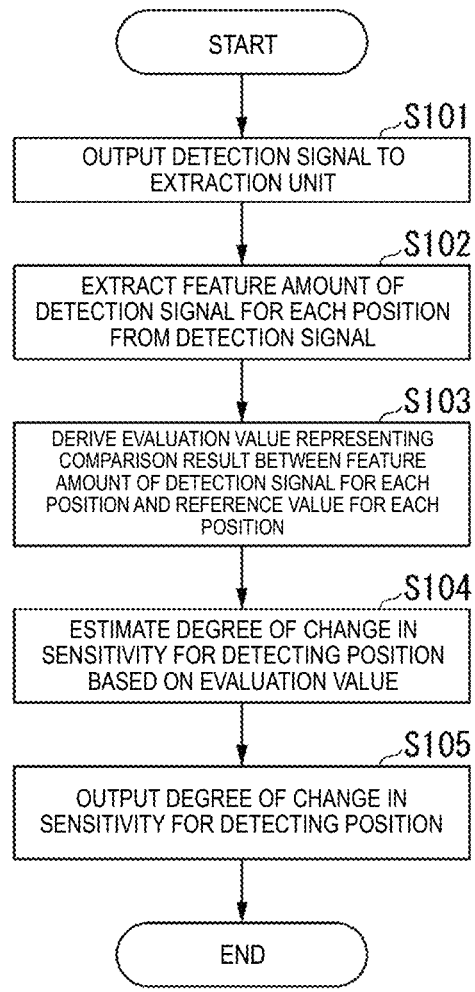
FIG. 8 is a flowchart illustrating an operation example of the sensor assembly in the first example embodiment.

Next, an operation example of the sensor assembly 1a will be described. FIG. 8 is a flowchart illustrating an operation example of the sensor assembly 1a in the first example embodiment. Each of the magnetic sensors 300 outputs a detection signal for each position of the magnet 2 to the extractor 301 (Step S101). The extractor 301 extracts a feature amount of a detection signal from the detection signal for each position of the magnet 2 (Step S102).

The estimator 312 derives an evaluation value. The evaluation value represents a comparison result between a feature amount of a detection signal for each position of the magnet 2 and a reference value for each position of the magnet 2 (Step S103). The estimator 312 estimates degree of change in sensitivity for detecting a position of the magnet 2 on the basis of an evaluation value (Step S104). The output unit 313 outputs degree of change in sensitivity for detecting the position to a predetermined external device (not illustrated) (Step S105).

As described above, the estimation device 3a is a device that estimates a state of the position sensor device 30 as a device that detects a position of the rotor 201 (rotating body). The estimation device 3a may estimate a state of the magnet 2 (for example, deterioration of a magnetic flux). The position sensor 302 outputs a detection signal, which is a signal representing a detection result of a position of the magnet 2 according to a magnetic flux of the magnet 2 rotatable in conjunction with the rotor 201 (rotating body), to the extractor 301. The extractor 301 extracts a feature amount of a detection signal from each detection signal for each position of the magnet 2. The estimator 312 derives an evaluation value representing a comparison result between a feature amount of a detection signal for each position of the magnet 2 and a reference value for each position of the magnet 2. The estimator 312 estimates degree of change (for example, degradation) in sensitivity (for example, sensitivity) for detecting a position of the magnet 2 on the basis of the evaluation value.

As described above, the estimator 312 derives an evaluation value representing a comparison result between a feature amount of a detection signal for each position of the magnet 2 and a reference value for each position of the magnet 2. This makes it possible to estimate degree of change in sensitivity of position detection without providing an additional dedicated sensor for estimating degree of change in sensitivity of position detection. Here, as illustrated in FIG. 4, degree of change in sensitivity of the magnetic sensor 300 can be detected in units of pole pairs. Further, as illustrated in FIG. 5, degree of change in sensitivity of the magnetic sensor 300 can be detected in units of magnetic sensors (in units of position sensors).

Figure 9:
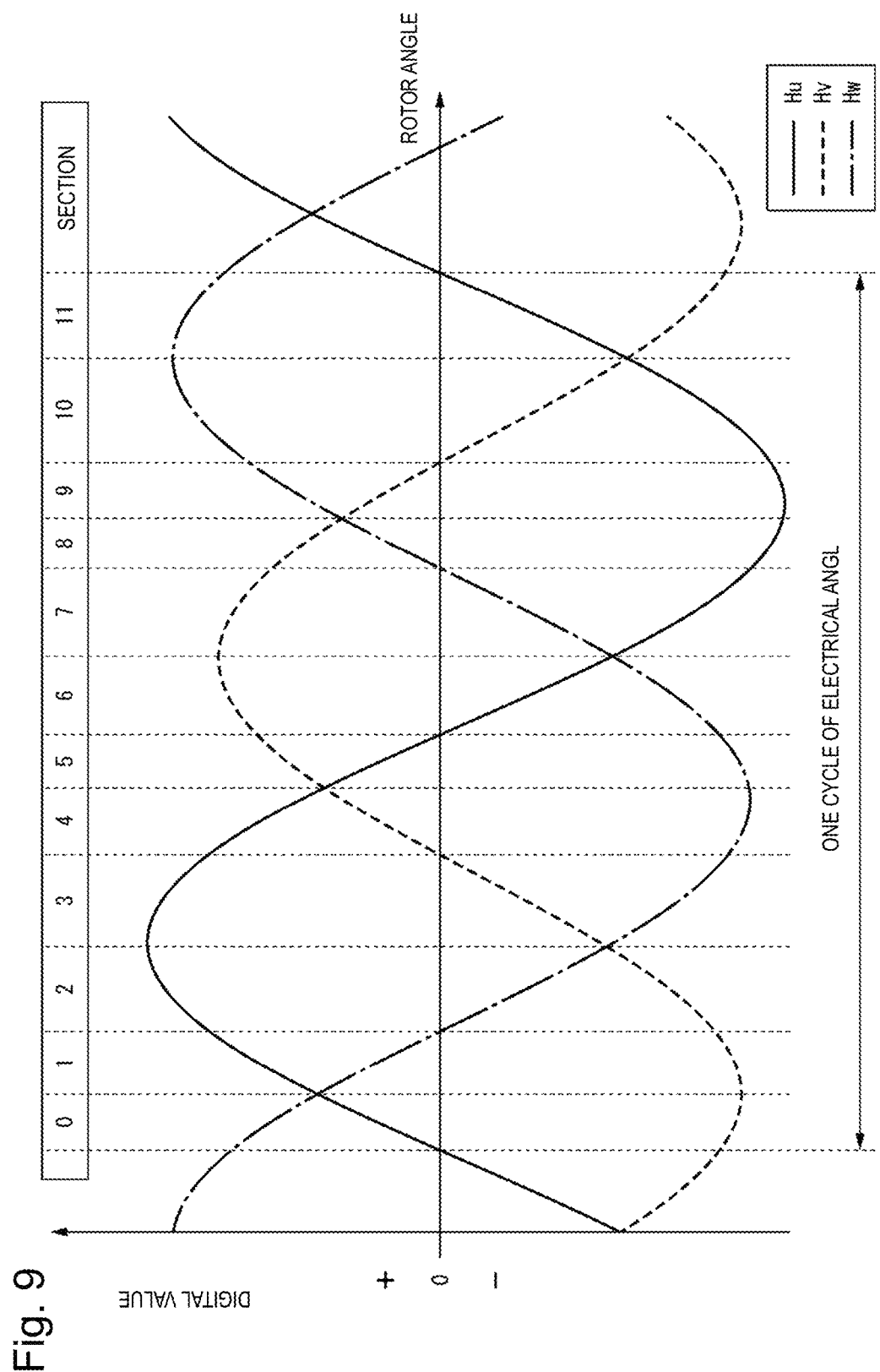
FIG. 9 is a diagram illustrating an example of a detection signal in a variation of the first example embodiment.

FIG. 9 is a diagram illustrating an example of a detection signal in a variation of the first example embodiment. The extractor 301 may use a digital value of each detection signal in which in-phase noise is corrected as it is as a feature amount of a detection signal as described below.

The storage unit 311 stores arrangement data of detection signals in such as manner as a U-phase detection signal U[i], a V-phase detection signal V[i], and a W-phase detection signal W[i]. Here, "i" represents a sample number (1 to s). A value "s" represents the number of samples in one cycle of a mechanical angle. Since the number of sample points becomes large, the storage capacity of the storage unit 311 may be increased.

A second example embodiment is different from the first example embodiment in that the position sensor 302 is provided in a housing of a motor. In the second example embodiment, a difference from the first example embodiment will be mainly described.

Figure 10:
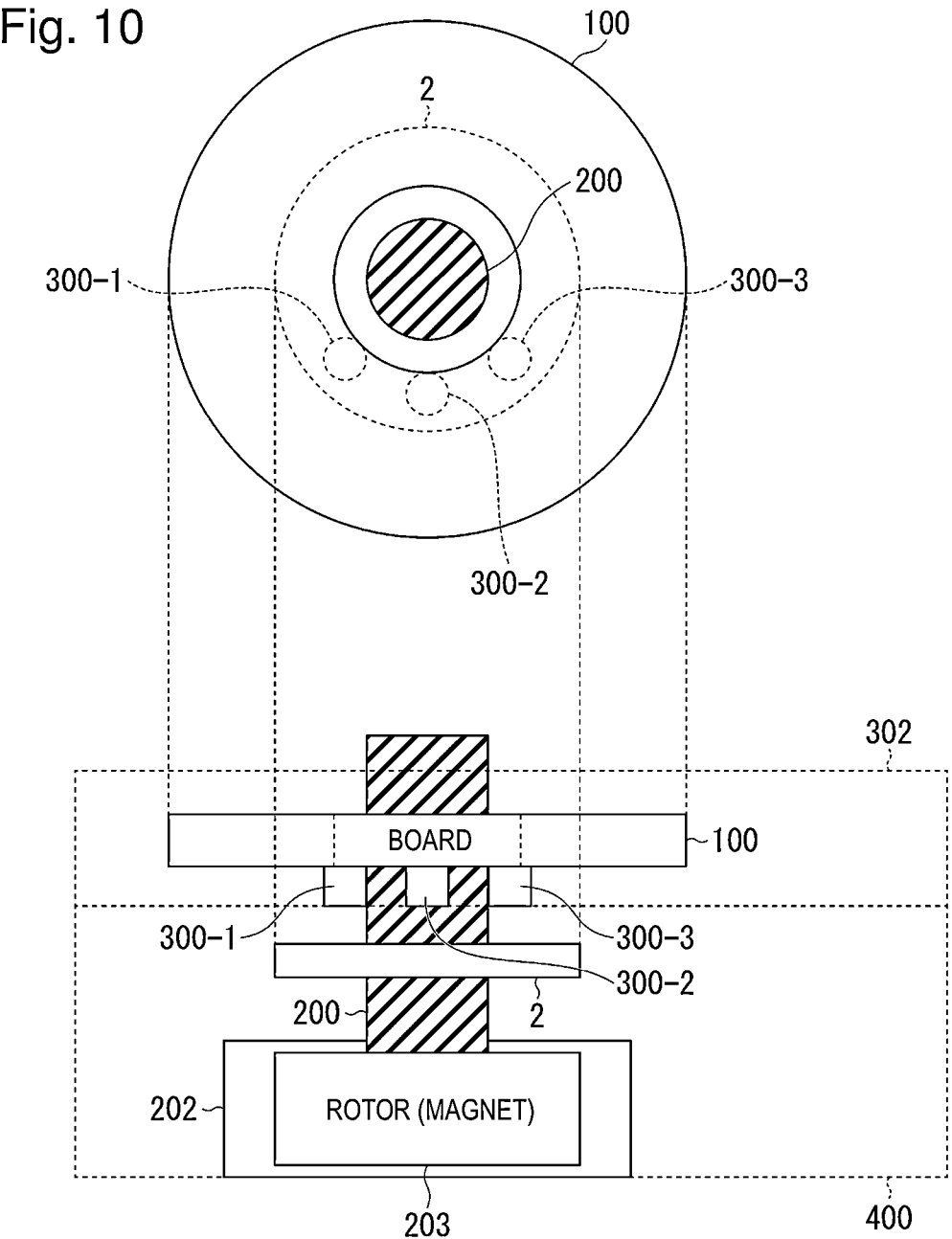
FIG. 10 is a diagram illustrating a configuration example of a position sensor according to a second example embodiment of the present disclosure.

FIG. 10 is a diagram illustrating a configuration example of the position sensor 302 in the second example embodiment. An upper part of FIG. 10 represents an upper surface of the position sensor 302. A lower part of FIG. 10 illustrates a side surface of the position sensor 302. M of the magnetic sensors 300 are provided on the board 100 whose position is fixed. In the second example embodiment, "M" is three as an example.

A stator 202 is an electromagnet including a U-phase coil, a V-phase coil, and a W-phase coil. When current corresponding to a command value flows through each phase coil, a magnetic flux is generated in the stator 202. A rotor 203 is a magnet. The stator 202 and the rotor 203 constitute a motor. The rotor 203 includes the main shaft 200. The magnet 2 is connected to the main shaft 200. When the rotor 203 rotates, the main shaft 200 rotates. The magnet 2 is rotatable in conjunction with the rotor 203 and the main shaft 200. In FIG. 10, the main shaft 200 is arranged so as to pass through the board 100. That is, the position sensor 302 is fixed to a housing 400 to which the stator 202 is fixed without coming into contact with the main shaft 200.

Note that the magnet 2 connected to the main shaft 200 may be provided outside the housing 400. In a case where the magnet 2 connected to the main shaft 200 is provided outside the housing 400, the position sensor 302 is provided between the magnet 2 and the housing 400. Further, M of the magnetic sensors 300 are provided on a surface of the board 100 of the position sensor 302 on the side close to the magnet 2.

As described above, the position sensor 302 is fixed to the housing 400 to which the stator 202 is fixed without coming into contact with the main shaft 200. The position sensor 302 outputs a detection signal, which is a signal representing a detection result of a position of the magnet 2, to the extractor 301. As described above, the estimator 312 derives an evaluation value representing a comparison result between a feature amount of a detection signal for each position of the magnet 2 and a reference value for each position of the magnet 2. This makes it possible to estimate degree of change in sensitivity of position detection without providing an additional dedicated sensor in a motor for estimating degree of change in sensitivity of position detection.

A third example embodiment is different from the first and second example embodiments in that a rotor (magnet) of a motor is used as a magnet for a position sensor. In the third example embodiment, a difference from the first example embodiment and the second example embodiment will be mainly described.

Figure 11:
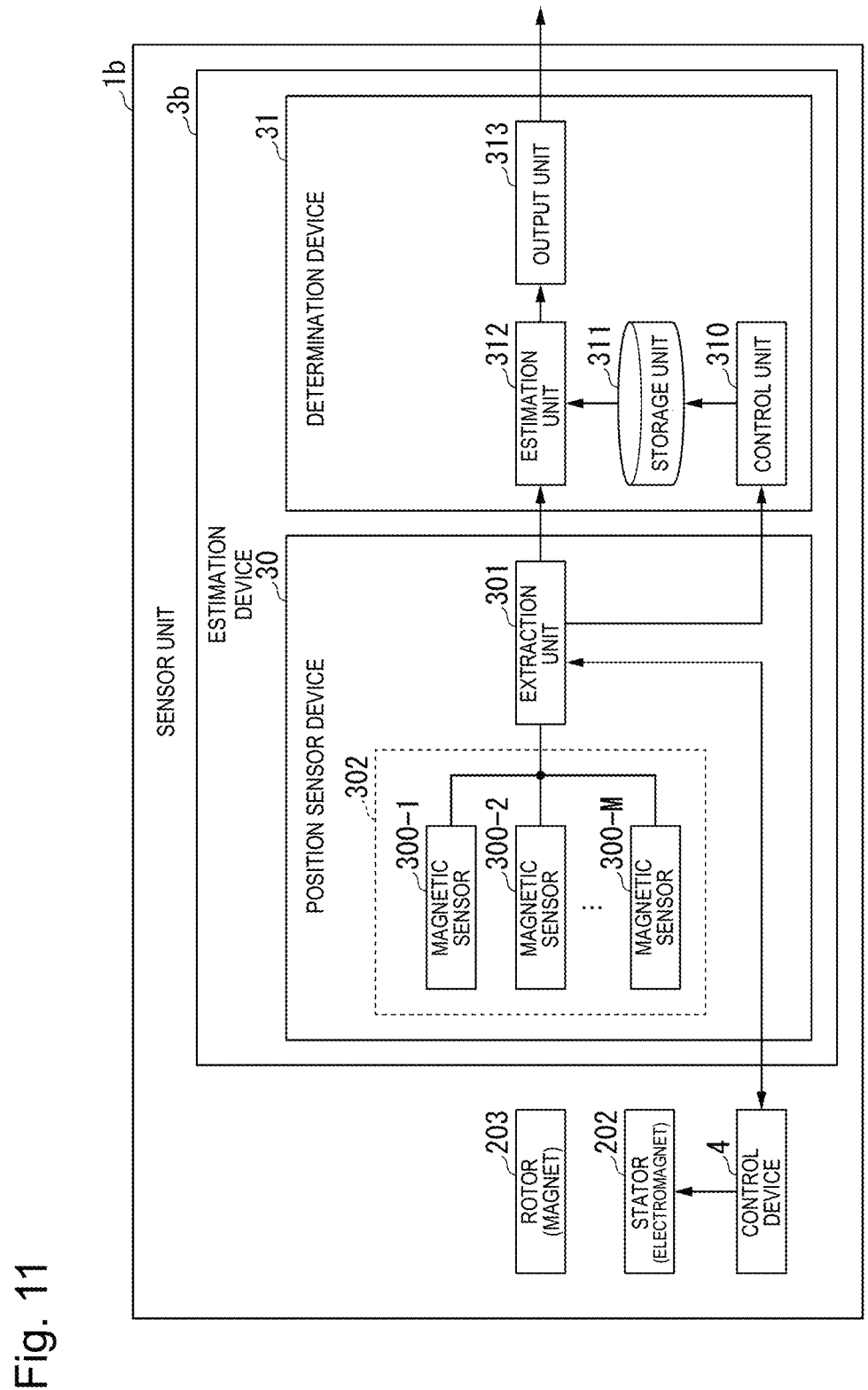
FIG. 11 is a diagram illustrating a configuration example of a sensor assembly according to a third example embodiment of the present disclosure.

FIG. 11 is a diagram illustrating a configuration example of a sensor assembly 1b in the third example embodiment. The sensor assembly 1b includes an estimation device 3b and a control device 4. The estimation device 3b includes the position sensor device 30 and the determination device 31. The position sensor device 30 includes M of the magnetic sensors 300 and the extractor 301. The position sensor device 30 includes M of the magnetic sensors 300 as the position sensor 302. In the third example embodiment, "M" is six as an example. The determination device 31 includes the control unit 310, the storage unit 311, the estimator 312, and the output unit 313.

Figure 12:
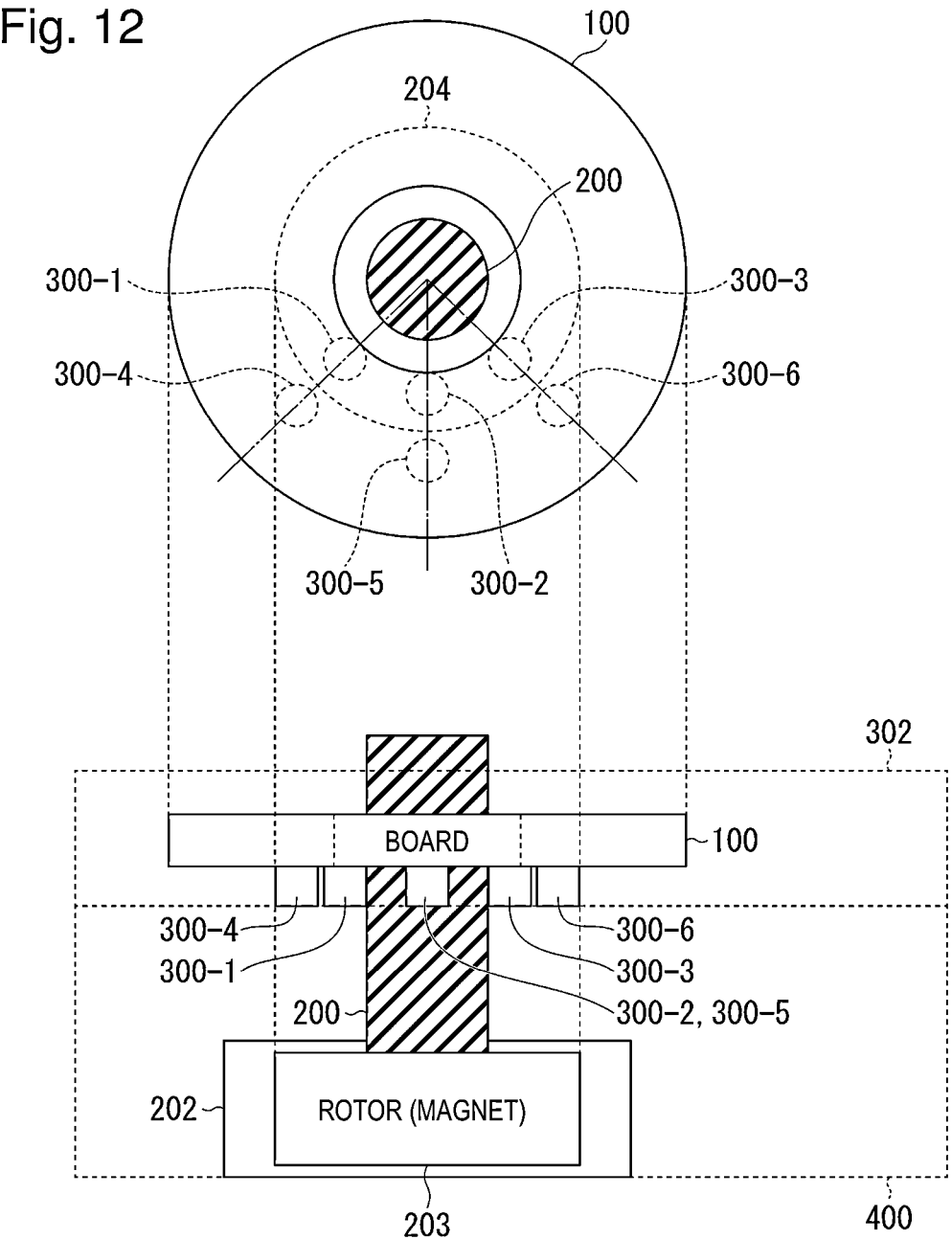
FIG. 12 is a diagram illustrating a configuration example of the position sensor in the third example embodiment.

FIG. 12 is a diagram illustrating a configuration example of the position sensor 302 in the third example embodiment. An upper part of FIG. 12 represents an upper surface of the position sensor 302. A lower part of FIG. 12 illustrates a side surface of the position sensor 302.

The stator 202 is an electromagnet including a U-phase coil, a V-phase coil, and a W-phase coil. When current corresponding to a command value flows through each phase coil, a magnetic flux is generated in the stator 202. The rotor 203 is a magnet. The stator 202 and the rotor 203 constitute a motor. The rotor 203 includes the main shaft 200. When the rotor 203 (magnet) rotates, the main shaft 200 rotates. In FIG. 12, the main shaft 200 is arranged so as to pass through the board 100. That is, the position sensor 302 is fixed to the housing 400 to which the stator 202 is fixed without coming into contact with the main shaft 200. The rotor 203 is used as a magnet for a position sensor that detects a position of the rotor 203 as a substitute for the magnet 2. The control device 4 determines a current value to be applied to the stator 202 (electromagnet) based on command values such as a rotational speed and a torque value and position information (angle information) of the rotor 203 (magnet) obtained from the position sensor device 30. The control device 4 generates a magnetic field by causing current to flow through the stator 202 (electromagnet) based on a determined current value, and controls driving of the rotor 203.

M of the magnetic sensors 300 are provided on the board 100 whose position is fixed. In the third example embodiment, "M" is six as an example. The magnetic sensors 300-1 to 300-3 (a plurality of first magnetic sensors) are provided near a magnet defining the rotor 203. Magnetic sensors 300-4 to 300-6 (a plurality of second magnetic sensors) are provided in the vicinity of the stator 202 at a distance from the main shaft 200 larger than a distance between the magnetic sensors 300-1 to 300-3 and the main shaft 200. In FIG. 12, the magnetic sensor 300-4, the magnetic sensor 300-1, and the main shaft 200 are arranged on a straight line. The magnetic sensor 300-5, the magnetic sensor 300-2, and the main shaft 200 are arranged on a straight line. The magnetic sensor 300-6, the magnetic sensor 300-3, and the main shaft 200 are arranged on a straight line.

The magnetic sensors 300-1 to 300-3 detect magnetic fluxes from both the rotor 203 (magnet) and the stator 202 (electromagnet), and output a detection signal to the extractor 301. A detection signal output from any of the magnetic sensors 300-1 to 300-3 is expressed by Equation (2).

The magnetic sensors 300-4 to 300-6 also detect magnetic fluxes from both the rotor 203 (magnet) and the stator 202 (electromagnet), and output a detection signal to the extractor 301. A detection result of a magnetic flux component output from any of the magnetic sensors 300-4 to 300-6 is expressed as Equation (3).

[Equation 2]

$$V_{HA}(\theta)=x^*\varphi_m(\theta)+j^*\varphi_s(\theta,I) \qquad (2)$$

[Equation 3]

$$V_{HB}(\theta)=y^*\varphi_m(\theta)+k^*\varphi_s(\theta,I) \qquad (3)$$

Here, "VHA" represents a detection signal (magnetic flux component amount) output from any of the magnetic sensors 300-1 to 300-3. "VHB" represents a detection result (detection result of a magnetic flux component) output from any of the magnetic sensors 300-4 to 300-6. A value "$\varphiس(\theta,I)$" represents a magnetic flux component (leakage magnetic flux component) of the stator 202. A value "$\varphi_m(\theta)$" represents a magnetic flux component of the rotor 203. A value "θ" represents an electrical angle of the rotor 203. A value "I" represents a value of current flowing through a coil of the stator 202.

Coefficients "x", "y", "j", and "k" are coefficients depending on a structure of a motor and arrangement of a magnetic sensor, and are determined on the basis of results of experiments or simulations, for example. The coefficient "x" is a coefficient in a term of a magnetic flux of the rotor 203, and is, for example, a coefficient corresponding to each distance between the magnetic sensors 300-1 to 300-3 and the rotor 203. The coefficient "y" is a coefficient in a term of a magnetic flux of the stator 202, and is, for example, a coefficient corresponding to each distance between the magnetic sensors 300-4 to 300-6 and the rotor 203.

The coefficient "j" is a coefficient in a term of a magnetic flux of the stator 202, and is, for example, a coefficient corresponding to each distance between the magnetic sensors 300-1 to 300-3 and the stator 202. The coefficient "k" is a coefficient in a term of a magnetic flux of the stator 202, and is, for example, a coefficient corresponding to each distance between the magnetic sensors 300-4 to 300-6 and the stator 202.

In view of the above, using a detection result of a magnetic flux component of the stator 202, the extractor 301 extracts a signal representing a detection result of a magnetic flux component of only the stator 202 from each of detection signals output from the magnetic sensors 300-1 to 300-6. The detection result (correction value) of the magnetic flux component of only the stator 202 is expressed as the right side of Equation (4). For example, based on the detection signal "VHA" output from the magnetic sensor 300-1 and the detection signal (magnetic flux component amount) "VHB" output from the magnetic sensor 300-4, the extractor 301 derives a detection result of a magnetic flux component of only the stator 202 as indicated on the right side of Equation (4).

[Equation 4]

$$V_{HB}(\theta) - \frac{y}{x} * V_{HA}(\theta) = \left(k - \frac{y}{x} * j\right)\varphi_s(\theta) \quad (4)$$

The extractor 301 acquires a command value of an amount of current flowing in the stator 202 from the control device 4. The extractor 301 derives an estimated value of a magnetic flux component of only the stator 202 based on the command value of an amount of current flowing in the stator 202. The estimator 312 can estimate a state of the stator 202 by comparing the estimated value of the magnetic flux component of only the stator 202 with a detection result of the magnetic flux component of only the stator 202. A magnetic flux component of the stator 202 is measured at the time of assembly or shipment from a factory, and is stored in the storage unit 311 in advance. The estimator 312 can also estimate a state of the stator 202 by comparing a magnetic flux component of the stator 202 stored in advance in the storage unit 311 with a detected magnetic flux component.

As described above, the estimation device 3b is a device that estimates a state of the position sensor device 30 as a device that detects a position of the rotor 203 (rotating body) and a state of the stator 202. The estimation device 3b may estimate a state of the rotor 203 (for example, deterioration of a magnetic flux). The estimator 312 estimates degree of change in the stator 202 based on a difference between an estimated value of a magnetic flux component of the stator 202 based on current flowing through the stator 202 and a detection result of a magnetic flux component of only the stator 202. This makes it possible to improve sensitivity for estimating degree of change in sensitivity of position detection without providing an additional dedicated sensor for estimating degree of change in sensitivity of position detection.

A fourth example embodiment is different from the first to third example embodiments in that a sensor assembly includes a plurality of position sensor devices and a single determination device (the determination device is a center determination type). In the fourth example embodiment, a difference from the first to third example embodiments will be mainly described.

Figure 13:
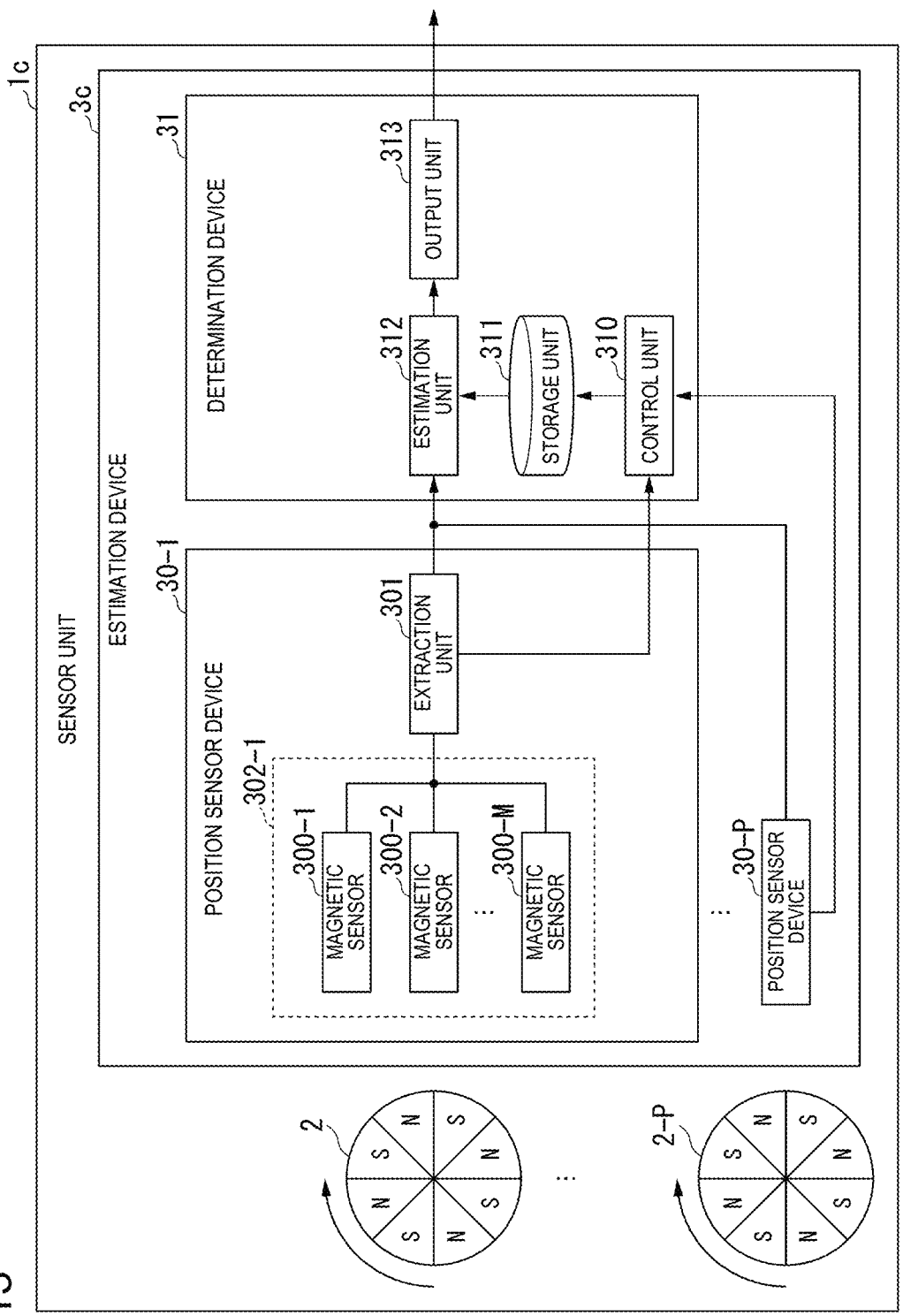
FIG. 13 is a diagram illustrating a configuration example of a sensor assembly according to a fourth example embodiment of the present disclosure.

FIG. 13 is a diagram illustrating a configuration example of a sensor assembly 1c in the fourth example embodiment. The sensor assembly 1c includes P (P is an integer of two or more) of the magnets 2 and an estimation device 3c. The estimation device 3c includes P of the position sensor devices 30 and the determination device 31. The position sensor device 30 includes M of the magnetic sensors 300 and the extractor 301. The position sensor device 30 includes M of the magnetic sensors 300 as the position sensor 302. The determination device 31 includes the control unit 310, the storage unit 311, the estimator 312, and the output unit 313.

A position sensor 302-p (p is any integer from two to P) outputs a detection signal, which is a signal representing a detection result of a position of a magnet 2-p (a magnetic flux component of a pole pair), to the extractor 301. The extractor 301 reduces in-phase noise in each detection signal. The extractor 301 extracts a feature amount of a detection signal from each detection signal for each position of the magnet 2. The extractor 301 outputs a feature amount (array data) of a detection signal for each position to the estimator 312 and the control unit 310.

As described above, the estimation device 3c is a device that estimates a state of the position sensor device 30 as a device that detects a position of the rotor 201 or the rotor 203 (rotating body). The estimation device 3c may estimate a state of the magnet 2. The number of the magnets 2 is plural. The position sensor device 30 includes the position sensor 302 for each of the magnets 2. This makes it possible to improve degree of change in sensitivity of position detection for a plurality of the magnets 2 without providing an additional dedicated sensor for estimating degree of change in sensitivity of position detection.

Further, it is possible to estimate a change in the stator 202 (change in a magnetic flux). It is possible to estimate a change in distance between the stator 202 and the magnetic sensor 300. It is possible to estimate a state of the stator 202. The state of the stator 202 is, for example, a change in resistance of a winding wire of a slot, the presence or absence of disconnection, a change in an amount of current due to a temperature rise, a change in an amount of a magnetic flux component, or the like. Note that, in the second example embodiment described above, an additional one of the magnetic sensor 300 may be provided on the board 100. The additional one of the magnetic sensor 300 is able to detect changes in magnetic flux such that a state of the stator 202, including a magnitude of the leakage flux of the stator 202, can be estimated.

The procedure of each processing may be performed by recording a program for implementing the function of the estimation device in the present disclosure on a computer-readable recording medium (not illustrated), and causing a computer system to read the program recorded on the recording medium (non-transitory recording medium) to execute the program. Note that the "computer system" described here includes an OS and hardware such as peripheral devices. The "computer system" also includes a WWW system provided with a website provision environment (or display environment). The "computer-readable recording medium" refers to portable media such as a flexible disk, a magneto-optical disk, a ROM, and a CD-ROM, and storage devices such as a hard disk incorporated into a computer system. Furthermore, the "computer-readable recording medium" shall include those hold a program for a certain period of time such as a volatile memory (RAM) in a computer system serving as a server or a client in a case where a program is transmitted via a network such as the Internet or a communication line such as a telephone line.

Further, the program described above may be transmitted from a computer system in which this program is stored in a storage device or the like to another computer system via a transmission medium or by a transmission wave in the transmission medium. Here, the "transmission medium" transmitting a program refers to a medium having a function of transmitting information such as a network (communication network) such as the Internet or a communication line such as a telephone line. Further, the program described above may be for implementing a part of the function described above. Furthermore, the program may be what is called a difference file (difference program), which can implement the above-described function in combination with a program already recorded in the computer system.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. An estimation device that estimates a state of a device that detects a position of a rotating body, the estimation device comprising:
   a position sensor to output a detection signal that is a signal representing a detection result of a position of a magnet rotatable in conjunction with the rotating body according to a magnetic flux of the magnet;
   an extractor to extract a feature amount of the detection signal from the detection signal for each of the positions; and
   an estimator to derive an evaluation value representing a comparison result between a feature amount of the detection signal for each of the positions and a reference value for each of the positions, and to estimate a degree of change in sensitivity to detect the position based on the evaluation value.

2. The estimation device according to claim 1, wherein the estimator is operable to determine that a magnetic flux of a pole pair of the magnet associated with one cycle of an electrical angle in one cycle of a mechanical angle indicating the position changes in a case where the evaluation value indicates that a feature amount of the detection signal changes with respect to a reference value for each of the positions in one cycle of the electrical angle.

3. The estimation device according to claim 1, wherein
magnetic sensors are provided at equal intervals or substantially equal intervals along a rotation direction of a rotation axis of the rotating body; and
the estimator is operable to determine that a distance between the magnet and the magnetic sensors changes or a sensitivity of the magnetic sensors changes in a case where the evaluation value indicates that a feature amount of the detection signal of any of the magnetic sensors changes with respect to a reference value for each of the positions in one cycle of a mechanical angle representing the position.

4. The estimation device according to claim 1, wherein
the position sensor includes a magnetic sensor to detect a magnetic flux of the magnet for each of the detection signals; and
the estimator is operable to determine that magnetic fluxes of all pole pairs of the magnet change, distances between the magnet and all the magnetic sensors change, or a sensitivity of all the magnetic sensors changes in a case where the evaluation value indicates that feature amounts of the detection signals of all the magnetic sensors change with respect to a reference value for each of the positions in one cycle of a mechanical angle representing the position.

5. The estimation device according to claim 1, wherein
the position sensor includes first magnetic sensors provided in a vicinity of the magnet defining a rotor of a motor, and second magnetic sensors provided in a vicinity of a stator of the motor;
the extractor is operable to derive a detection result of a magnetic flux component of the stator based on the detection signal input from the first magnetic sensors and a detection result of a magnetic flux component input from the second magnetic sensors; and
the estimator is operable to estimate a degree of change of the stator based on a difference between an estimation value of a magnetic flux component of the stator based on current flowing through the stator and a detection result of a magnetic flux component of the stator.

6. The estimation device according to claim 1, wherein a plurality of the magnets is provided, and a respective one of the position sensors is provided for each of the plurality of the magnets.

7. An estimation method executed by an estimation device that estimates a state of a device that detects a position of a rotating body, the estimation method comprising:
   outputting a detection signal that is a signal representing a detection result of a position of a magnet rotatable in conjunction with the rotating body according to a magnetic flux of the magnet;
   extracting a feature amount of the detection signal from the detection signal for each of the positions; and
   deriving an evaluation value representing a comparison result between a feature amount of the detection signal for each of the positions and a reference value for each of the positions, and estimating a degree of change in sensitivity to detect the position based on the evaluation value.

8. A tangible non-transitory computer readable medium containing a program which causes a computer to function as the estimation device according to claim 1.

* * * * *